(12) United States Patent
Ishiguro

(10) Patent No.: US 7,527,881 B2
(45) Date of Patent: May 5, 2009

(54) CLEANING MEDIUM

(75) Inventor: Tadashi Ishiguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 531 days.

(21) Appl. No.: 11/225,165

(22) Filed: Sep. 14, 2005

(65) Prior Publication Data

US 2006/0066998 A1   Mar. 30, 2006

(30) Foreign Application Priority Data

Sep. 27, 2004   (JP)   ............ P. 2004-279210

(51) Int. Cl.
   *G11B 5/33*   (2006.01)
   *B32B 17/08*   (2006.01)
   *A47L 13/00*   (2006.01)
(52) U.S. Cl. ............ 428/838; 428/800; 428/141; 15/104.001
(58) Field of Classification Search ............ 428/838, 428/842.2, 327, 839.6, 844.4, 845.1, 845.2, 428/848.4, 848.2, 848.7, 522, 336, 900, 220, 428/141, 800; 242/348; 216/90; 360/132, 360/134, 128; 15/104.001
See application file for complete search history.

(56) References Cited

U.S. PATENT DOCUMENTS

2002/0086183 A1   7/2002   Misawa

| 2002/0102438 | A1* | 8/2002 | Saito et al. ............ 428/845.1 |
| 2002/0106497 | A1 | 8/2002 | Ishiguro et al. |
| 2003/0031884 | A1* | 2/2003 | Honda et al. ............ 428/336 |
| 2003/0170498 | A1* | 9/2003 | Inoue ............ 428/839.6 |
| 2004/0058197 | A1* | 3/2004 | Nakamura et al. ....... 428/848.2 |
| 2004/0257703 | A1* | 12/2004 | Honda et al. ............ 360/128 |

FOREIGN PATENT DOCUMENTS

| EP | 1 271 521 A2 | 1/2003 |
| EP | 1 441 331 A2 | 7/2004 |
| JP | 62-92205 A | 4/1987 |
| JP | 62-94270 A | 4/1987 |
| JP | 4-330611 A | 11/1992 |
| JP | 2002-230727 A | 8/2002 |
| JP | 2004-259373 A | 9/2004 |

OTHER PUBLICATIONS

Patent Abstracts of Japan—JP-A-2000-011342, Shimizu Yoshihiro, "Cleaning Tape and its Production".
European Search Report dated Jan. 20, 2006.
Japanese Office Action dated Dec. 3, 2008.

* cited by examiner

Primary Examiner—Kevin M Bernatz
Assistant Examiner—Louis Falasco
(74) Attorney, Agent, or Firm—Sughrue Mion, PLLC

(57) ABSTRACT

A cleaning medium comprising: a backcoat layer; a nonmagnetic support; and a cleaning layer containing ferromagnetic powder and a binder, in this order, wherein the cleaning layer has projections having a height of 10 nm or higher on a surface of the cleaning layer at a density of from 0.10 to 5.0/$\mu m^2$ and a surface microhardness of from 294 to 784 MPa.

10 Claims, 2 Drawing Sheets

(TOP VIEW)

CLEANING MEDIUM

FIELD OF THE INVENTION

This invention relates to a cleaning medium, such as a cleaning tape, for cleaning a magnetic head or a running system of a magnetic recording and reproducing device for audio, video or computer applications.

BACKGROUND OF THE INVENTION

Recording and reproduction in a magnetic recording device for audio, video or computer applications are generally performed by contact sliding between a magnetic head and a magnetic recording medium, e.g., magnetic tape. If contaminated with adherent debris (stains) from tape dust or surrounding dust, the magnetic head has reduced reproduction output and eventually fails to produce output. In order to restore the reduced reproduction output, a cleaning medium, such as a cleaning tape, is used to remove the adherent stains from the surface of the magnetic head.

On the other hand, magnetic recording density has been increasing every year. Unless a magnetic head and magnetic tape are in good contact, failure to achieve sufficient writing and reading would be experienced more frequently. To maintain a good head contact, a cleaning tape has come to be required to perform not only the head cleaning function but also a function to regulate the shape of a head to some extent. In particular, a magnetic head used in recent magnetic recording devices capable of high density recording at a shortest recording wavelength of 1 µm or less has a gap length of 0.4 µm or less. Even a trace of dirt or dust on such a magnetic head would interfere with read performance.

With the ever increasing recording density, a magnetoresistive (MR) head has come into use. A shielded MR head for general use has a height of several microns or less. Accordingly, wear of an MR head should be minimized more strictly than demanded for conventional ferrite heads or metal heads (e.g., a Sendust head).

In recent years, magnetic recording devices capable of using both an ME (metal evaporate) tape and an MP (metal particle) tape, such as Hi-8 and DVC, have appeared on the market. Because the thin metal film of ME tape is highly rigid, it is difficult to obtain a good head contact, i.e., satisfactory read and write characteristics, unless the magnetic head keeps a sharp tip. Containing no abrasive grains, ME tape shows little running-in behavior with the magnetic head and therefore has poor conformity or frictional compatibility with the head. On the other hand, since the magnetic layer of the MP tape has magnetic powder dispersed in a binder, the touch of the magnetic tape to the magnetic head is soft so that the shape of the head tip is not so influential on the head contact of the tape. Furthermore, the magnetic powder exerts wearing effect to have satisfactory conformity to the magnetic head. Accordingly, when MP tape runs on a magnetic head on which ME tape has run, there is no appreciable change in head contact. To the contrary, when ME tape runs after MP tape has run, poor head contact can result.

JP-A-62-92205 discloses a double-layered polishing tape used to polish a magnetic head comprising a nonmagnetic support, an intermediate layer containing nonmagnetic powder formed on the support, and an abrasive layer containing a nonmagnetic abrasive formed on the intermediate layer. The polishing tape is designed such that the intermediate layer has a rough surface profile and that the upper abrasive layer contains fine abrasive particles so as to prevent scratching a magnetic head while maintaining necessary abrasive force. However, the tape is for finish-polishing a magnetic head, and it abrades a head too much to be used as a cleaning tape for carrying out moderate abrasion, as is understood from its surface roughness of from 0.03 to 0.3 µm. A similar double-layered polishing tape is disclosed in JP-A-62-94270. With this tape, too, it is difficult to perform cleaning by moderate abrasion without scratching a magnetic head. The tape is therefore unfit for use as a cleaning medium.

As stated, the demand for minimizing a wear of an MR head is stricter than for a ferrite head or a metal (e.g., Sendust) head. An effective solution to this issue has been awaited.

SUMMARY OF THE INVENTION

An object of the present invention is to provide a cleaning medium which cleans a magnetic head of a high density magnetic recording and reproducing device, especially an MR head, with a minimized wear of the head thereby to restore the reproduction output.

The present invention provides a cleaning medium having a nonmagnetic support, a cleaning layer containing ferromagnetic powder and a binder on one side of the nonmagnetic support, and a backcoat layer on the other side of the nonmagnetic support. The cleaning layer has projections having a height of 10 nm or higher on its surface at a density of 0.10 to 5.0/µm$^2$ and a surface microhardness of 294 to 784 MPa (corresponding to 30 to 80 kg/mm$^2$).

In a preferred embodiment of the invention, the cleaning medium further has an undercoat layer containing nonmagnetic inorganic powder and a binder as main components between the nonmagnetic support and the cleaning layer.

In another preferred embodiment of the invention, the cleaning medium has a surface resistivity of 1×10$^7$ Ω/sq. or less.

The present invention provides a cleaning medium having a specific projection distribution and a specific microhardness on the cleaning layer thereof, with which a magnetic head of a high density magnetic recording and reproducing device, especially an MR head, can be cleaned with a minimized wear to restore the reduced reproduction output.

DETAILED DESCRIPTION OF THE INVENTION

The cleaning medium of the invention basically comprises a nonmagnetic support, a cleaning layer containing ferromagnetic powder and a binder provided on one side of the support, and a backcoat layer provided on the other side of the support. In a preferred embodiment of the invention, the cleaning medium further has an undercoat layer mainly comprising nonmagnetic inorganic powder and a binder between the nonmagnetic support and the cleaning layer. In what follows, the present invention will be described in detail chiefly with reference to the embodiment in which the cleaning medium has the undercoat layer.

The cleaning medium of the invention is characterized by the number of projections per unit area and the microhardness of the cleaning layer.

The cleaning layer has on its surface projections of 10 nm or higher at a density of 0.10 to 5.0/µm$^2$, preferably 0.20 to 4.0/µm$^2$, still preferably 0.50 to 3.0/µm$^2$. The projection density is obtained by scanning an area of 40 μm by 40 μm with an atomic force microscope Nanoscope III (from Digital Instrument) in contact mode, slicing the 3D surface profile at a level 10 nm high from the mean plane, a reference plane for which the volumes embraced by the 3D profile above and below the plane are equal, and counting the number of the peaks sliced off and the peaks in contact with the slicing plane.

The cleaning surface with the specified projection density exerts proper cleaning performance for an MR head. If the projection density is smaller than $0.10/\mu m^2$, the cleaning force is too small to remove stains. If the projection density is larger than $5.0/\mu m^2$, the cleaning medium damages an MR head due to excessive abrasion.

The cleaning layer has a surface microhardness of 294 to 784 MPa (30 to 80 kg/mm$^2$), preferably 392 to 686 MPa (40 to 70 kg/mm$^2$), still preferably 392 to 588 MPa (40 to 60 kg/mm$^2$).

Figure 1:
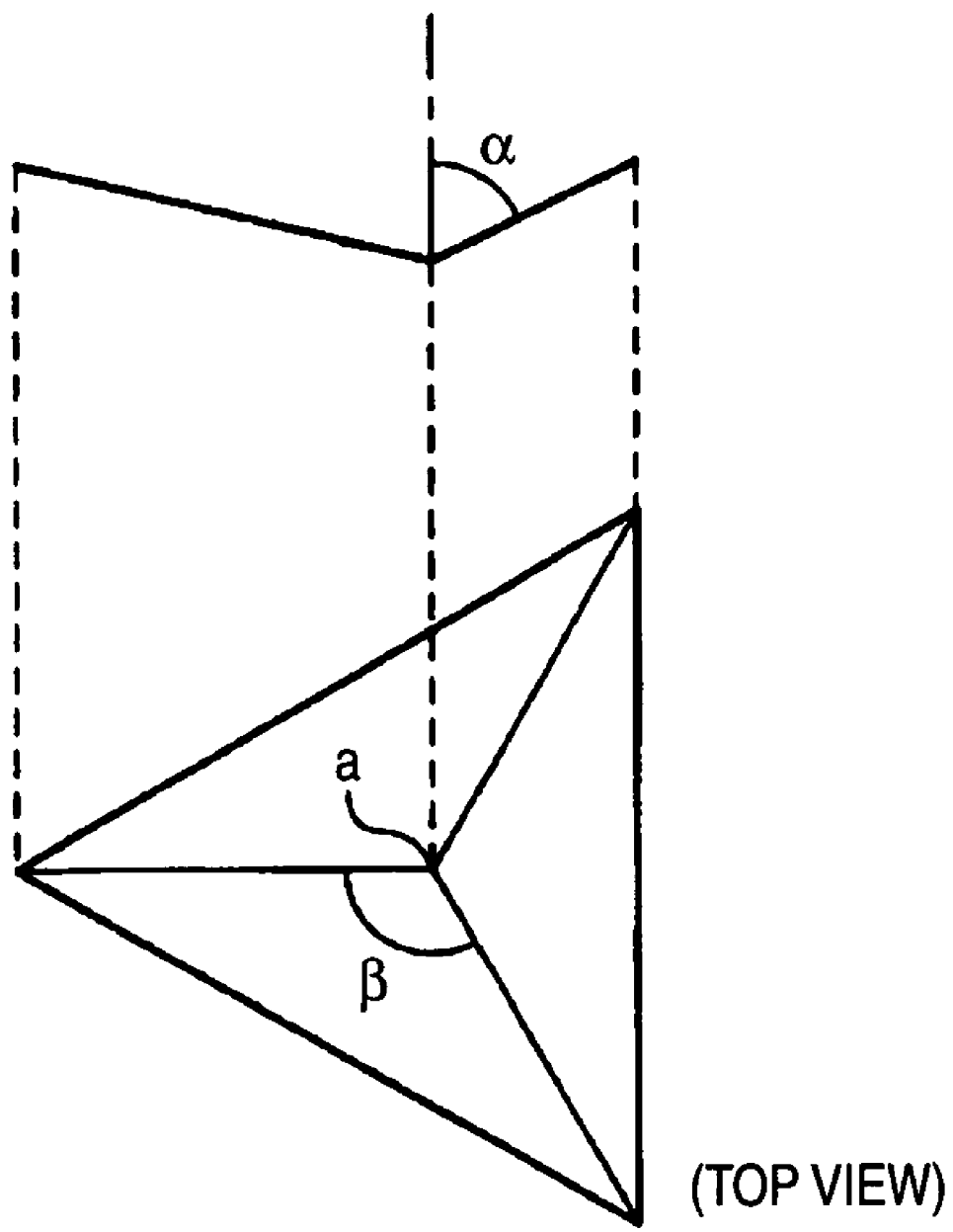
FIG. 1 illustrates a nanoindenter used in microhardness measurement in the present invention.
Figure 2:
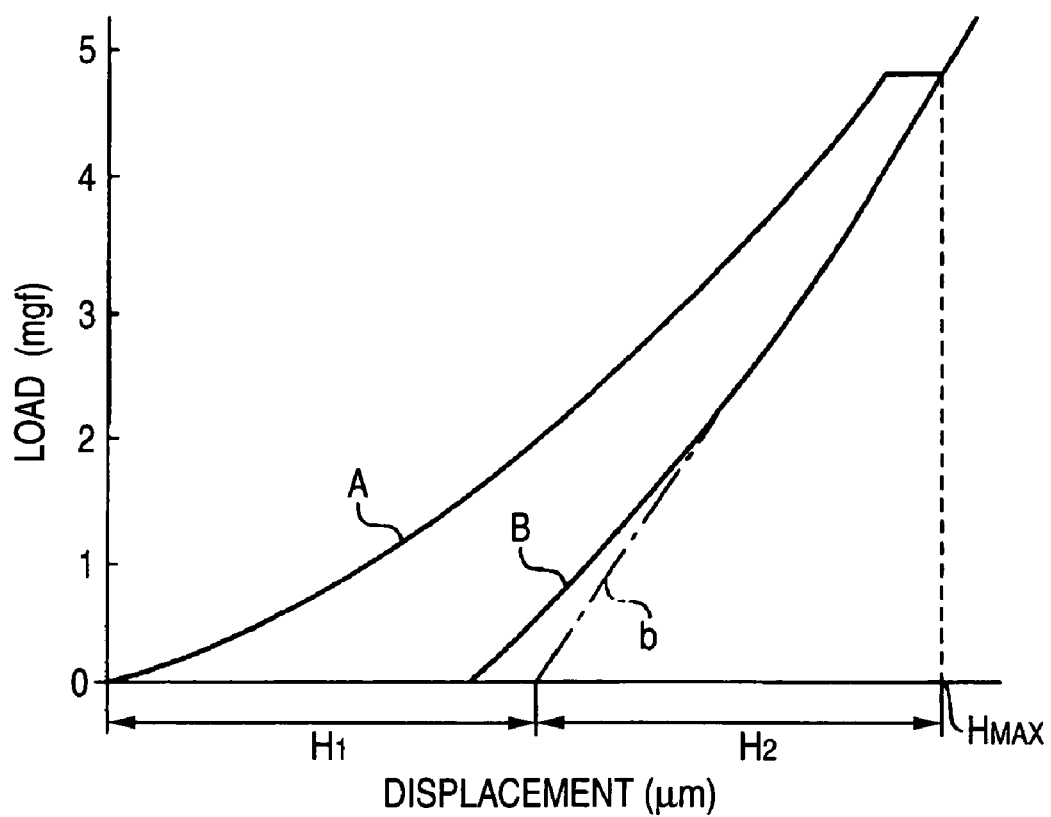
FIG. 2 is an illustrative load vs. displacement graph, by which a plastic deformation is defined.

The microhardness of the cleaning layer surface is measured as follows. FIGS. 1 and 2 are referred to. A three-sided pyramidal diamond nanoindenter (known as a Berkovich indenter) having a tip radius of 100 nm at the vertex a, a rake angle α of 65°, and an apex angle β of 115° was used. A plastic deformation under a load of 5 mgf by the nanoindenter is obtained. A microhardness meter equipped with the nanoindenter and capable of measurement under a load of 5 mgf includes a nanoindentation tester ENT-1100a available from Elionix Inc. FIG. 2 is a graph showing change in displacement (μm) when a sample is loaded by the indenter up to 5 mgf (loading curve A) and then unloaded (unloading curve B). As is seen from the graph, the displacement increases with the load increasing up to the maximum displacement Hmax at 5 mfg. When unloaded, the displacement gradually decreases but stops at a certain level. A tangent b to the unloading curve at the maximum displacement Hmax is extrapolated to zero load (i.e., the abscissa) to obtain a plastic displacement ($H_1$). The microhardness (DH) of the sample is calculated from the maximum displacement (Hmax) and the maximum load (Pmax=5 mgf) according to equation (1):

$$DH=3.7926\times10^{-2}(Pmax/(Hmax)^2) \quad (1)$$

If the microhardness of the cleaning layer is less than 294 MPa (30 kg/mm$^2$), the cleaning layer is scratched by a magnetic head, and the generated dust adheres to the head to increase an error rate. If the microhardness exceeds 784 MPa (80 kg/mm$^2$), a magnetic head is worn and easily scratched.

Means for obtaining the recited projection density and microhardness include, but are not limited:

(1) adjusting the size and the amount of various particles used in the cleaning layer and/or the undercoat layer,
(2) adjusting calendering conditions of the cleaning layer and/or the undercoat layer, and
(3) adjusting the degree of dispersion (e.g., dispersing time) of a coating composition for making the cleaning layer.

The ferromagnetic powder that can be used in the cleaning layer includes known ferromagnetic powders, such as γ-FeO$_x$ (where x=1.33 to 1.5), Co-doped γ-FeO$_x$ (where x=1.33 to 1.5), ferromagnetic alloy powders comprising α-Fe, Ni or Co as a main component (75% or more), barium ferrite, and strontium ferrite. The Ferromagnetic alloy powders mainly comprising α-Fe are preferred. The ferromagnetic powders may contain other elements in addition to the main elements, such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, and Mg. Ferromagnetic metal powders preferably contain, in addition to α-Fe, at least one of Al, Si, Ca, Y, Ba, La, Nd, Co, Ni, and B. At least one of Si, Al, and Y is important as a surface treating agent or a sintering inhibitor. A preferred Co content is 2% to 40% by weight based on Fe. A preferred Si, Al or Y content is 0% to 10% by weight based on Fe. Prior to dispersing, the ferromagnetic powder may be subjected to pretreatment with a dispersant, a lubricant, a surface active agent or an antistatic agent described infra. For the details, reference can be made to JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, and U.S. Pat. Nos. 3,026,215, 3,031,341, 3,100,194, 3,242,005, and 3,389,014.

Of the ferromagnetic powders, the ferromagnetic alloy powder may contain a small amount of a hydroxide or an oxide. The ferromagnetic alloy powder can be prepared by known processes including reduction of a composite organic acid complex salt (mainly an oxalate) with a reducing gas (e.g., hydrogen); reduction of iron oxide with a reducing gas (e.g., hydrogen) into Fe or Fe—Co particles; pyrolysis of a metal carbonyl compound; reduction of a ferromagnetic metal by adding a reducing agent (e.g., sodium borohydride, a hypophosphite or hydrazine) to an aqueous solution of the ferromagnetic metal; and vaporization of a metal in a low-pressure inert gas. The resulting ferromagnetic alloy powder may be subjected to a known slow oxidation treatment including immersion in an organic solvent followed by drying; immersion in an organic solvent, bubbling an oxygen-containing gas through the solvent to form an oxide film, followed by drying; and forming an oxide film in an atmosphere having a controlled oxygen to inert gas ratio without using an organic solvent.

The ferromagnetic powder has a BET specific surface area ($S_{BET}$) of 45 to 80 m$^2$/g, preferably 50 to 70 m$^2$/g. An $S_{BET}$ less than 45 m$^2$/m or more than 80 m$^2$/g results in poor surface properties. The ferromagnetic powder has a crystallite size of 10 to 30 nm, preferably 10 to 25 nm, still preferably 14 to 20 nm.

The ferromagnetic powder preferably has a saturation magnetization (σs) of 100 to 180 A·m$^2$/kg, preferably 110 to 170 A·m$^2$/kg, still preferably 125 to 160 A·cm$^2$/kg. The ferromagnetic powder preferably has a coercive force (Hc) of 500 to 3000 Oe (≈40 to 240 kA/m) and a squareness ratio of 0.6 to 0.98. The amount of magnetization of the cleaning layer is preferably 30 to 300 mT·μm. The ferromagnetic powder preferably has an acicular ratio of 4 to 18, still preferably 5 to 12. The ferromagnetic powder preferably has a water content of 0.01% to 2%. The water content of ferromagnetic powder is preferably optimized according to the kind of the binder.

The pH of the ferromagnetic powder is usually 4 to 12, preferably 6 to 10. The pH is preferably optimized according to the kind of the binder. If desired, the ferromagnetic powder is surface treated with Al, Si, P or an oxide thereof so as to limit the adsorption of a lubricant such as a fatty acid to 100 mg/m$^2$ or less. The surface treating agent is usually used in an amount of 0.1% to 10% by weight based on the ferromagnetic powder. Although it is essentially preferred for the ferromagnetic powder to be free of inorganic ions, such as Na, Ca, Fe, Ni, and Sr ions, presence of up to 200 ppm of such inorganic ions is little influential on the characteristics. The ferromagnetic powder preferably has as low a void as possible. The void is preferably up to 20% by volume, still preferably 5% by volume or lower.

The binders that can be used in the cleaning layer and the undercoat layer include conventionally known thermoplastic resins, thermosetting resins and reactive resins, and mixtures thereof. Thermoplastic resins used as a binder generally have a glass transition temperature of −100° to 150° C., an number average molecular weight of 1,000 to 200,000, preferably 10,000 to 100,000, and a degree of polymerization of about 50 to 1000.

Such thermoplastic resins include homo- or copolymers containing a unit derived from vinyl chloride, vinyl acetate, vinyl alcohol, maleic acid, acrylic acid, an acrylic ester, vinylidene chloride, acrylonitrile, methacrylic acid, a methacrylic ester, styrene, butadiene, ethylene, vinyl butyral, vinyl acetal, a vinyl ether, etc.; polyurethane resins, and various rubber resins. Useful thermosetting or reactive resins include phenolic resins, epoxy resins, thermosetting polyurethane resins, urea resins, melamine resins, alkyd resins, reactive acrylic resins, form aldehyde resins, silicone resins, epoxypolyamide resins, polyester resin/isocyanate prepolymer mixtures, polyester polyol/polyisocyanate mixtures, and polyurethane/polyisocyanate mixtures. For the details of these resin binders, *Plastic Handbook,* Asakura Shoten (publisher) can be referred to. Known electron beam (EB)-curing resins can also be used in each layer. The details of the EB-curing resins and methods of producing them are described in JP-A-62-256219.

The above-recited binder resins can be used either individually or as a combination thereof. Preferred binder formulations include a combination of (a) a polyurethane resin and (b) at least one vinyl chloride resin selected from polyvinyl chloride, a vinyl chloride-vinyl acetate copolymer, a vinyl chloride-vinyl acetate-vinyl alcohol copolymer, and a vinyl chloride-vinyl acetate-maleic anhydride copolymer, and a combination of (a), (b), and (c) polyisocyanate.

The polyurethane resin includes those of known structures, such as polyester polyurethane, polyether polyurethane, polyether polyester polyurethane, polycarbonate polyurethane, polyester polycarbonate polyurethane, polycaprolactone polyurethane, and polyolefin polyurethane. Particularly preferred of them are polyurethane resins obtained from a polyol component and an organic diisocyanate as main raw materials and containing a short chain diol component having a cyclic structure, a long chain polyether polyol component, and a polar group-containing long chain polyol component having a molecular weight of 500 to 5000 as the polyol component.

In order to ensure dispersing capabilities and durability, it is preferred to introduce into the above-recited binder resins at least one polar group by copolymerization or through addition reaction, the polar group being selected from —COOM, —SO$_3$M, —OSO$_3$M, —P=O(OM)$_2$, —O—P=O(OM)$_2$ (wherein M is a hydrogen atom or an alkali metal base), —OH, —NR$_2$, —N$^+$R$_3$ (wherein R is a hydrocarbon group), an epoxy group, —SH, —CN, sulfobetaine, phosphobetaine, and carboxybetaine. The amount of the polar group to be introduced is $10^{-1}$ to $10^{-8}$ mol/g, preferably $10^{-2}$ to $10^{-6}$ mol/g.

Examples of commercially available binder resins which can be used in the invention are VAGH, VYHH, VMCH, VAGF, VAGD, VROH, VYES, VYNC, VMCC, XYHL, XYSG, PKHH, PKHJ, PKHC, and PKFE (from Union Carbide Corp.); MPR-TA, MPR-TA5, MPR-TAL, MPR-TSN, MPR-TMF, MPR-TS, MPR-TM, and MPR-TAO (from Nisshin Chemical Industry Co., Ltd.); 1000w, DX80, DX81, DX82, DX83, and 100FD (from Denki Kagaku Kogyo K. K.); MR-104, MR-105, MR110, MR100, and 400X-110A (from Zeon Corp.); Nipporan series N2301, N2302, and N2304 (from Nippon Polyurethane Industry Co., Ltd.); Pandex series T-5105, T-R3080, and T-5201, Barnock series D-400 and D-210-80, and Crisvon series 6109 and 7209 (from Dainippon Ink & Chemicals, Inc.); Vylon UR series 8200, 8300, and 8700 (from Toyobo Co., Ltd.); Daiferamin series 4020, 5020, 5100, 5300, 9020, 9022, and 7020 (from Dainichiseika Color & Chemicals Mfg. Co., Ltd.); MX5004 (from Mitsubishi Chemical Corp.); Sanprene SP-150, TIM-3003, and TIM-3005 (from Sanyo Chemical Industries, Ltd.); and Saran F series 310 and 210 (from Asahi Chemical Industry Co., Ltd.). Preferred of them are MR-104, MR110, MPR-TAO, MPR-TA, UR-8200, UR-8300, and TIM-3005.

The binder is used in the cleaning layer in an amount of 5% to 24% by weight, preferably 8% to 22% by weight, based on the inorganic powder inclusive of the magnetic powder. The binder is usually used in the undercoat layer in an amount preferably of 15 to 40 parts by weight, still preferably 20 to 30 parts by weight, per 100 parts by weight of the nonmagnetic inorganic powder. Where a vinyl chloride resin, a polyurethane resin, and polyisocyanate are used in combination, their amounts are selected from a range of 5% to 30% by weight, a range of 2% to 20% by weight, and a range of 2% to 20% by weight, respectively.

The polyurethane to be used preferably has a glass transition temperature of −50° to 100° C., an elongation at break of 100% to 2000%, a stress at rupture of 0.05 to 10 kg/mm$^2$ (≈0.49 to 98 Mpa), and a yield point of 0.05 to 10 kg/mm$^2$ (≈0.49 to 98 Mpa).

The cleaning medium of the invention is preferably composed of two or more coating layers. These layers can have different binder formulations in terms of the binder content, the proportions of a vinyl chloride resin, a polyurethane resin, polyisocyanate, and other resins, the molecular weight of each resin, the amount of the polar group introduced, and other physical properties of the resins. Known optimization technology can be made use of in designing the binder formulation.

The polyisocyanate that can be used in the binder formulation includes tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate. Further included are reaction products between these isocyanate compounds and polyols and polyisocyanates produced by condensation of the isocyanates. Examples of commercially available polyisocyanates useful in the invention are Coronate L, Coronate HL, Coronate 2030, Coronate 2031, Millionate MR, and Millionate MTL (from Nippon Polyurethane Industry Co., Ltd.); Takenate D-102, Takenate D-110N, Takenate D-200, and Takenate D-202 (from Takeda Chemical Industries, Ltd.); Desmodur L, Desmodur IL, Desmodur N, and Desmodur HL (from Sumitomo Bayer Urethane Co., Ltd.); and Burnock D502 (from Dainippon Ink & Chemicals, Inc.). They can be used in each layer, either alone or as a combination of two or more thereof taking advantage of difference in curing reactivity.

The cleaning layer may contain carbon black as an inorganic powder. The carbon black that can be used in the cleaning layer includes furnace black for rubber, thermal black for rubber, carbon black for colors, and acetylene black. The carbon black preferably has a specific surface area of 5 to 500 m$^2$/g, a oil (DBP) absorption of 10 to 400 ml/100 g, a pH of 2 to 10, a water content of 0.1% to 10% by weight, and a tap density of 0.1 to 1 g/cc.

It is preferred, in particular, for the carbon black to have a primary particle size of 10 to 80 nm, still preferably 10 to 40 nm. Particles whose primary particle size is greater than 80 nm form too many projections on the cleaning layer surface, which can cause head wear or scratch.

Specific examples of commercially available carbon black which can be used in the cleaning layer include Black Pearls 2000, 1300, 1000, 900, 800, and 700, and Vulcan XC-72

(from Cabot Corp.); #80, #60, #55, #50, and #35 (from Asahi Carbon Co., Ltd.); #2400B, #2300, #5, #900, #950, #970, #1000, #30, #40, and #10B (from Mitsubishi Chemical Corp.); and Conductex SC, RAVEN 150, 50, 40, and 15 (from Columbian Carbon). Carbon black having been surface treated with a dispersant, etc., resin-grafted carbon black, or carbon black with its surface partially graphitized may be used. Carbon black may previously been dispersed in a binder before being added to a coating composition for forming the cleaning layer. The above-recited carbon black species can be used either individually or as a combination thereof.

The carbon black, if added, is preferably used in an amount of 0.1 to 1.0 part by weight per 100 parts by weight of the ferromagnetic powder. At amounts less than 0.1 part by weight, the projection density on the cleaning layer is reduced to have reduced cleaning effects. At amounts more than 1.0 part by weight, too many projections tend to cause head wear and scratches.

Carbon black serves for not only magnetic head cleaning but antistatic control, reduction of frictional coefficient, reduction of light transmission, film strength enhancement, and the like. These functionalities vary depending on the species. Accordingly, it is possible to optimize the kinds, amounts, and combinations of the carbon black species for each layer according to the intended purpose with reference to the above-mentioned characteristics, such as particle size, oil absorption, conductivity, pH, and so forth.

Known abrasives having a Mohs hardness of 6 or higher can be incorporated into the cleaning layer as the inorganic powder. Such abrasives include α-alumina having an α-phase content of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. These abrasives can be used either individually or as a mixture thereof or as a composite thereof (an abrasive surface treated with another). Existence of impurity compounds or elements, which are sometimes observed in the abrasives, will not affect the effect as long as the content of the main component is 90% by weight or higher. Examples of commercially available abrasives which can be used are AKP-20, AKP-30, AKP-50, HIT-50, HIT-60, HIT-60A, HIT-70A, HIT-80, HIT-80G, and HIT-100 (from Sumitomo Chemical Co., Ltd.); G-5, G-7, and S-1 (from Nippon Chemical Industrial Co., Ltd.); TF100 and TF140 (from Toda Kogyo Corp.).

The abrasive preferably has an average particle size of 0.01 to 2 μm. Abrasives different in particle size maybe used in combination, if necessary, or a single kind of an abrasive having a broadened size distribution may be used to produce the same effect. The abrasives preferably have a tap density of 0.3 to 2 g/cc, a water content of 0.1% to 5% by weight, a pH of 2 to 11, and a specific surface area of 1 to 30 m$^2$/g. The abrasive grains may be needle-like, spherical or cubic. Angular grains are preferred for high cleaning performance. The amount of the abrasive to be used in the cleaning layer as an inorganic powder is 1% to 45% by weight based on the ferromagnetic powder. If necessary, the abrasive can also be incorporated into the undercoat layer. Understandably, the kinds, amounts, and the combination of the abrasives added to the cleaning layer and the undercoat layer can be optimized for each layer according to the purpose. The abrasives may previously be dispersed in a binder before being added to the magnetic coating composition for the cleaning layer.

The density of the abrasive grains appearing on the surface and the edge face of the cleaning layer is preferably 5/100μm$^2$ or more.

The undercoat layer and the cleaning layer can contain other additives capable of producing lubricating effects, antistatic effects, dispersing effects, plasticizing effects, and the like. Such additives include molybdenum disulfide, tungsten disulfide, graphite, boron nitride, graphite fluoride, silicone oils, polar group-containing silicones, fatty acid-modified silicones, fluorine-containing silicones, fluorine-containing alcohols, fluorine-containing esters, polyolefins, polyglycols, alkylphosphoric esters and alkali metal salts thereof, alkylsulfuric esters and alkali metal salts thereof, polyphenyl ethers, fluorine-containing alkylsulfuric esters and alkali metal salts thereof, saturated or unsaturated, straight-chain or branched mono-to hexahydric alcohols having 12 to 22 carbon atoms, alkoxyalcohols having 12 to 22 carbon atoms, and aliphatic amines having 8 to 22 carbon atoms.

The cleaning layer and the undercoat layer can contain surface active agents. Useful surface active agents include nonionic ones, such as alkylene oxide types, glycerol types, glycidol types, and alkylphenol ethylene oxide adducts; cationic ones, such as cyclic amines, ester amides, quaternary ammonium salts, hydantoin derivatives, heterocyclic compounds, phosphonium salts, and sulfonium salts; anionic ones containing an acidic group, such as a carboxyl group, a sulfonic acid group, a phosphoric acid group, a sulfuric ester group or a phoshoric ester group; and amphoteric ones, such as amino acids, aminosulfonic acids, amino alcohol sulfuric or phosphoric esters, and alkyl betaines. For the details of the surface active agents, refer to *Kaimen Kasseizai Binran* published by Sangyo Tosho K. K. The above-recited lubricants, antistatic agents, and like additives do not always need to be 100% pure and may contain impurities, such as isomers, unreacted materials, by-products, decomposition products, and oxides. Nevertheless, the proportion of the impurities is preferably 30% by weight at the most, still preferably 10% by weight or less.

In the present invention, it is preferred to incorporate a fatty acid amide, a fatty acid, and a fatty acid ester as a lubricant. Examples of the fatty acid amide include those having 8 to 22 carbon atoms. Examples of the fatty acid include monobasic fatty acids having 10 to 24 carbon atoms and metal (e.g., Li, Na, K or Cu) salts thereof. Examples of the fatty acid ester include esters between monobasic fatty acids having 10 to 24 carbon atoms and alcohols having 4 to 22 carbon atoms.

The fatty acid and the fatty acid and/or the alcohol of the fatty acid amide or ester may be saturated or unsaturated and straight-chain, branched or cyclic. The fatty acid and/or the alcohol may have an alkoxy group or an alkylene oxide polymer or a monoalkyl ether thereof. The fatty acid ester may have one or more ester groups and is preferably a mono-, di- or triester. The fatty acid ester may have a hydroxyl group remaining unesterified. The fatty acid amide may have one or more amide groups and may have a residual carboxyl group. A proper choice should be made among the fatty acid amides, fatty acids, and fatty acid esters in connection with the projection distribution on the cleaning layer surface. At least one kind of the fatty acid amides, fatty acids, and fatty acid esters may be used as a mixture of two or more thereof.

Examples of the fatty acids and the fatty acid esters are lauric acid, myristic acid, palmitic acid, stearic acid, behenic acid, oleic acid, linoleic acid, linolenic acid, elaidic acid, butyl stearate, octyl stearate, amyl stearate, isooctyl stearate, octyl myristate, butoxyethyl stearate, anhydrosorbitan monostearate, anhydrosorbitan distearate, and anhydrosorbitan tristearate. The fatty acid amides include those derived from the above-enumerated fatty acids.

The total amount of the lubricant selected from the fatty acid amide, the fatty acid, and the fatty acid ester to be used in the cleaning layer is preferably 0.1 to 10 parts by weight, still preferably 0.5 to 5 parts by weight, per 100 parts by weight of the ferromagnetic powder. The amount of each of the fatty acid amide, the fatty acid, and the fatty acid ester is optimized within the recited total amount. It is generally preferred that the amount to be added ascends in this order: fatty acid amide≦fatty acid≦fatty acid ester.

Commercially available products that can be made use of as a lubricant include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hardened castor oil fatty acids, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogly MB, Nonion DS-60, Anon BF, Anon LG, butyl stearate, butyl laurate, and erucic acid from NOF Corp.; oleic acid from Kanto Chemical Co., Ltd.; FAL 205 and FAL 123 from Takemoto Yushi K. K.; Enujelv OL, Enujelv IPM, and Sansosyzer E4030 from New Japan Chemical Co., Ltd.; TA-3, KF-96, KF-96L, KF-96H, KF-410, KF-420, KF-965, KF-54, KF-50, KF-56, KF-907, KF-851, X-22-819, X-22-822, KF-905, KF-700, KF-393, KF-857, KF-860, KF-865, X-22-980, KF-101, KF-102, KF-103, X-22-3710, X-22-3715, KF-910, and KF-3935 from Shin-Etsu Chemical Co., Ltd.; Armid P, Armid C, and Armoslip CP from Lion Armour Co., Ltd.; Duomeen TDO from Lion Corp.; BA-41G from Nisshin Oil Mills, Ltd.; and Profan 2012E, Newpol PE 61, Ionet MS-400, Ionet MO-200, Ionet DL-200, Ionet DS-300, Ionet DS-1000, and Ionet DO-200 from Sanyo Chemical Industries, Ltd.).

The amounts and the kinds of the lubricants and the surface active agents are appropriately decided for each of the cleaning layer and the undercoat layer according to the desired effects. The following is a few examples of manipulations using these additives. (1) Bleeding of fatty acid additives is suppressed by using fatty acids having different melting points between the cleaning layer and the undercoat layer. (2) Bleeding of ester additives is suppressed by using esters different in boiling point or polarity between the cleaning layer and the undercoat layer. (3) Coating stability is improved by adjusting the amount of the surface active agent. (4) The amount of the lubricant in the undercoat layer is increased to improve the lubricating effect. It is also a preferred manipulation that the fatty acid amide, the fatty acid, and the fatty acid ester added to the cleaning layer be also added to the undercoat layer.

All or part of the additives can be added at any stage of preparing a coating composition. For example, the additives can be blended with the inorganic powder before kneading, be mixed with the inorganic powder, the binder, and a solvent in the step of kneading, or be added during or after the step of dispersing or immediately before coating. The purpose of using an additive may be achieved by applying a part of, or the whole of, the additive on the cleaning layer either by simultaneous coating or successive coating, which depends on the purpose. A lubricant may be applied to the cleaning layer surface even after calendering or slitting, which depends on the purpose.

The nonmagnetic inorganic powder that can be used in the undercoat layer is selected from particles of inorganic compounds including metal oxides, metal carbonates, metal sulfates, metal nitrides, metal carbides, and metal sulfides. Examples of the inorganic compounds are α-alumina having an α-phase content of 90% to 100%, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. They can be used either individually or in combination. Preferred among them are titanium dioxide, zinc oxide, iron oxide, and barium sulfate, particularly titanium dioxide and α-iron oxide, in view of availability and cost and also because there are many means to impart functionality to these particles.

The nonmagnetic powder preferably has an average particle size of 0.005 to 2 μm. If desired, nonmagnetic powders different in particle size may be used in combination, or a single kind of a nonmagnetic powder having a broadened size distribution may be used to produce the same effect. A still preferred average particle size of the nonmagnetic powder is 0.01 to 0.2 μm. The nonmagnetic powder usually has a tap density of 0.05 to 2 g/ml, preferably 0.2 to 1.5 g/ml, a water content of 0.1% to 5% by weight, preferably 0.2% to 3% by weight, still preferably 0.3% to 1.5% by weight, a pH of 2 to 11, preferably 5 to 10, a specific surface area of 1 to 100 m$^2$/g, preferably 5 to 70 m$^2$/g, still preferably 10 to 65 m$^2$/g, an oil (DBP) absorption of 5 to 100 ml/100 g, preferably 10 to 80 ml/100 g, still preferably 20 to 60 ml/100 g, and a specific gravity of 1 to 12, preferably 3 to 6. The nonmagnetic powder preferably has a crystallite size of 0.004 to 1 μm, still preferably 0.04 to 0.1 μm. The particle shape may be needle-like, spherical, polygonal or tabular. In case of particles of general particulate shape, it is preferred that at least 50% by weight have an average particle size of 0.08 μm or smaller. In case of needle-like particles, at least 50% by weight preferably have an average length of 0.05 to 0.3 μm and an acicular ratio of 3 to 20.

The ignition loss of the nonmagnetic inorganic powder is preferably not more than 20% by weight and ideally zero. The inorganic nonmagnetic powder preferably has a Mohs hardness of 4 to 10. The roughness factor of the surface of the particles is preferably 0.8 to 1.5, still preferably 0.9 to 1.2. The nonmagnetic powder preferably has a SA (stearic acid) adsorption of 1 to 20 μmol/m$^2$, still preferably 2 to 15 μmol/m$^2$. The heat of wetting of the nonmagnetic powder with water at 25° C. is preferably 200 to 600 mJ/m$^2$). Solvents in which the nonmagnetic powder releases the recited heat of wetting can be used. The number of water molecules on the nonmagnetic powder at 100° to 400° C. is suitably 1 to 10 per 10 nm. The isoelectric point of the nonmagnetic powder in water is preferably pH 3 to 9.

It is preferred that the nonmagnetic inorganic powder be surface treated to have a surface layer of $Al_2O_3$, $SiO_2$, $TiO_2$, $ZrO_2$, $SnO_2$, $Sb_2O_3$, ZnO or $Y_2O_3$. Among these surface treating substances, preferred for dispersibility are $Al_2O_3$, $SiO_2$, $TiO_2$, and $ZrO_2$, with $Al_2O_3$, $SiO_2$, and $ZrO_2$ being still preferred. These surface treating substances may be used either individually or in combination. According to the purpose, a composite surface layer can be formed by co-precipitation or a method comprising first applying alumina to the nonmagnetic particles and then treating with silica or vise versa. The surface layer may be porous for some purposes, but a homogeneous and dense surface layer is usually preferred.

Specific examples of commercially available nonmagnetic powders that can be used in the undercoat layer include Nanotite from Showa Denko K. K.; HIT-100 and ZA-G1 from Sumitomo Chemical Co., Ltd.; α-hematite series DPN-250, DPN-250BX, DPN-245, DPN-270BX, and DPB-550BX from Toda Kogyo Corp.; titanium oxide series TTO-51B, TTO-55A, TTO-55B, TTO-55C, TTO-55S, and TTO-55D, SN-100, and α-hematite series E270, E271, and E300 from Ishihara Sangyo Kaisha, Ltd.; STT-4D, ST-30D, STT-30, and STT-65C from Titan Kogyo K. K.; MT-100S, MT-100T, MT-150W, MT-500B, MT-600B, T-100F, and T-500HD from Tayca Corp.; FINEX-25, BF-1, BF-10, BF-20, and ST-M from Sakai Chemical Industry Co., Ltd.; DEFIC-Y and DEFIC-R from Dowa Mining Co., Ltd.; AS2BM and TiO2P25 from Nippon Aerosil Co., Ltd.; 100A and 500A from Ube Industries, Ltd.; and Y-LOP from Titan Kogyo K. K. and calcined products thereof.

As stated, preferred of the nonmagnetic inorganic powders are α-iron oxide and titanium dioxide. Alpha-iron oxide (hematite) useful in the invention is prepared as follows. First of all, needle-like goethite particles are prepared as a precursor of $\alpha\text{-Fe}_2O_3$ powder by any of the following four processes. In a first process, an equivalent or more amount of an alkali hydroxide aqueous solution is added to an iron (II) salt aqueous solution to obtain a suspension containing colloidal iron (II) hydroxide, which is then oxidized by bubbling an oxygen-containing gas at pH 11 or higher and at 80° C. or lower to produce needle-like goethite particles. In a second process, an iron (II) salt aqueous solution and an alkali carbonate aqueous solution are allowed to react to obtain a suspension containing $FeCO_3$, which is oxidized by bubbling an oxygen-containing gas to form spindle-shaped goethite particles. In a third process, less than an equivalent amount of an alkali hydroxide or alkali carbonate aqueous solution is added to an iron (II) salt aqueous solution to obtain an iron (II) salt aqueous solution containing colloidal iron (II) hydroxide, which is then oxidized by bubbling an oxygen-containing gas to produce needle-like goethite core particles. To the resulting iron (II) salt aqueous solution containing needle-like goethite core particles is added an alkali hydroxide aqueous solution in an amount at least equivalent to the $Fe^{2+}$ ion content in the iron (II) salt aqueous solution, followed by bubbling an oxygen-containing gas to have the needle-like core particles grow. In a fourth process, needle-like goethite core particles are formed in the same manner as in the third process, which are then allowed to grow in an acidic to neutral region. Addition of a dopant hetero atom such as Ni, Zn, P or Si, which is usually added in practice to the goethite production system for improving powder characteristics, poses no problem.

The needle-like goethite particles thus obtained (precursor) are dehydrated at 200° to 500° C. to yield needle-like $\alpha\text{-Fe}_2O_3$ particles. If necessary, the particles after the dehydration are annealed by further heating at 350° to 800° C. Adhesion of a sintering inhibitor, e.g., P, Si, B, Zr, Sb, onto the needle-like goethite particles to be dehydrated or annealed poses no problem. The purpose of annealing (heat treatment at 350° to 800° C.) the dehydrated particles is to melt the very surface of the particles to eliminate pores created as a result of the dehydration thereby leveling the particle surface.

The needle-like $\alpha\text{-Fe}_2O_3$ particles thus obtained are dispersed in water, and an Al compound is added thereto, followed by pH adjustment, whereby the particles are coated with the added Al compound. The thus surface-treated particles are collected by filtration, washed with water, dried, and ground to powder. If desired, the powder is further subjected to degassing and compaction. Examples of the Al compound include aluminum salts, such as aluminum acetate, aluminum sulfate, aluminum chloride, and aluminum nitrate; and alkali metal aluminates, such as sodium aluminate. The amount of the Al compound to be added is 0.01% to 50% by weight in terms of Al based on the $\alpha\text{-Fe}_2O_3$ powder. At an amount less than 0.01% by weight, the effect of addition in improving dispersibility in a binder resin is insufficient. If added in an amount exceeding 50% by weight, the Al compound floating on the surface of the particles interacts with itself.

The Al compound may be used in combination with at least one of other surface treating compounds typically exemplified by an Si compound and additionally including a P compound, a Ti compound, an Mn compound, an Ni compound, a Zn compound, a Zr compound, an Sn compound and an Sb compound. The amount of the other surface treating compounds to be used in combination with the Al compound ranges from 0.01 to 50% by weight based on the $\alpha\text{-Fe}_2O_3$ powder. At an amount less than 0.01% by weight, the effect of addition in improving dispersibility in a binder resin is insubstantial. If added in an amount exceeding 50% by weight, the surface treating compound floating on the surface of the particles interacts with itself.

Titanium dioxide, which is another preferred nonmagnetic inorganic powder to be used in the undercoat layer is prepared as follows. There are two methods of producing titanium oxide, the sulfate process and the chloride process. In the sulfate process, ilmenite ore is digested with sulfuric acid, and sulfates of Ti, Fe, etc. are extracted. From the extract is crystallized and removed iron sulfate. The residual titanyl sulfate solution is filtered and hydrolyzed while hot to precipitate hydrous titanium oxide. The reaction system is filtered and washed to remove impurities. An agent for regulating particle size is added, followed by firing at 80° to 1000° C. to give crude titanium oxide. The structure type, rutile or anatase, is decided by the kind of a nucleating agent added in hydrolysis. The resulting crude titanium oxide is subjected to finishing treatments, such as grinding, classification, and surface treatment. The chloride process is applied to naturally-occurring rutile type ore or synthetic rutile. The ore is chlorinated at a high temperature in a reducing atmosphere, whereby Ti is converted to $TiCl_4$, and Fe to $FeCl_2$. Iron oxide precipitates on cooling and is thus separated from liquid $TiCl_4$. The resulting crude $TiCl_4$ is purified by rectification and, after addition of a nucleating agent, brought into an instantaneous reaction with oxygen at 1000° C. or higher to obtain crude titanium oxide, which is then subjected to the same finishing treatments as described above for imparting pigment properties.

The surface treatment of the crude titanium oxide is carried out as follows. The dry-ground crude titanium oxide is wet ground with water and a dispersing agent and centrifuged to remove coarse particles. The separated slurry containing fine particles is transferred to a surface treatment tank, where the titanium oxide particles are to be coated with a metal oxide. A predetermined amount of an aqueous solution of a salt of Al, Si, Ti, Zr, Sb, Sn, Zn, etc. is added to the slurry. An acid or an alkali for neutralization is added, whereby the titanium oxide particles are coated with a hydrous oxide of the metal. By-produced water-soluble salts are removed by decantation, filtration, and washing. After the pH of the slurry is adjusted, the slurry is filtered, and the filter cake is washed with pure water. The cake is dried with a spray dryer or a band dryer. The dry product is pulverized in a jet mill to yield a final product. Besides the water system, surface treatment with Al or Si can also be achieved by introducing vapor of $AlCl_3$ or $SiCl_4$ to the titanium oxide powder, then water vapor is made to flow. With respect to other producing methods of pigments, G. D. Parfitt and K. S. W. Sing, *Characterization of Powder Surfaces,* Academic Press (1976) can be referred to.

Carbon black can be incorporated into the undercoat layer to obtain a desired micro Vickers hardness as well as to produce known effects, i.e., reduction of surface resistivity Rs and reduction of light transmission. The nonmagnetic undercoat layer generally has a micro Vickers hardness of 25 to 60 kg/mm² (≈245 to 588 MPa). A preferred micro Vickers hardness for good head contact is 30 to 50 kg/mm² (≈294 to 490 MPa). A micro Vickers hardness can be measured with a thin film hardness tester (HMA-400 supplied by NEC Corp.) having an indenter equipped with a three-sided pyramid diamond tip, 80° angle and 0.1 μm end radius.

Useful carbon black species include furnace black for rubber, thermal black for rubber, carbon black for colors, and acetylene black. The carbon black has a specific surface area of 100 to 500 m²/g, preferably 150 to 400 m²/g, an oil (DBP) absorption of 20 to 400 ml/100 g, preferably 30 to 200 ml/100 g, and an average primary particle size of 10 to 80 nm, preferably 10 to 50 nm, still preferably 10 to 40 nm. The carbon black preferably has a pH of 2 to 10, a water content of 0.1% to 10%, and a tap density of 0.1 to 1 g/ml.

Specific examples of commercially available carbon black products for use in the undercoat layer include Black Pearls 2000, 1300, 1000, 900, 800, 880, and 700, and Vulcan XC-72 from Cabot corp.; #3050B, #3150B, #3250B, #3750B, #3950B, #950, #650B, #970B, #850B, MA-600, MA-230, #4000, and #4010 from Mitsubishi Chemical Corp.; Conductex SC and RAVEN 8800, 8000, 7000, 5750, 5250, 3500, 2100, 2000, 1800, 1500, 1255, and 1250 from Columbian Carbon; and Ketjen Black EC from Lion Akzo Co., Ltd. Carbon black having been surface treated with a dispersant, etc., resin-grafted carbon black, or carbon black with its surface partially graphitized may be used. Carbon black may previously been dispersed in a binder before being added to a coating composition. The carbon black species can be used either individually or as a combination thereof. In selecting carbon black species for use in the undercoat layer, reference can be made, e.g., to Carbon Black Kyokai (ed.), *Carbon Black Binran*.

The undercoat layer can contain organic powder according to the purpose. Useful organic powders include acrylic-styrene resin powders, benzoguanamine resin powders, melamine resin powders, and phthalocyanine pigments. Polyolefin resin powders, polyester resin powders, polyamide resin powders, polyimide resin powders, and polyethylene fluoride resin powders are also usable. Methods of preparing these organic powders are disclosed, e.g., in JP-A-62-18564 and JP-A-60-255827.

With respect to the other details of the nonmagnetic undercoat layer, that is, selection of the kinds and amounts of binder resins, lubricants, dispersants, additives, and solvents and methods of dispersing, the techniques as for the magnetic layer apply. In particular, known techniques with regard to the amounts and kinds of binder resins, additives, and dispersants to be used in a magnetic layer are useful.

Organic solvents that can be used in the preparation of the coating compositions for the cleaning layer and the undercoat layer include ketones, such as methyl ethyl ketone, methyl isobutyl ketone, diisobutyl ketone, cyclohexanone, isophorone, and tetrahydrofuran; alcohols, such as methanol, ethanol, propanol, butanol, isobutyl alcohol, isopropyl alcohol, and methyl cyclohexanol; esters, such as methyl acetate, butyl acetate, isobutyl acetate, isopropyl acetate, ethyl lactate, and glycol acetate; glycol ethers, such as glycol dimethyl ether, glycol monoethyl ether, and dioxane; aromatic hydrocarbons, such as benzene, toluene, xylene, cresol, and chlorobenzene; chlorinated hydrocarbons, such as methylene chloride, ethylene chloride, carbon tetrachloride, chloroform, ethylenechlorohydrin, and dichlorobenzene; N,N-dimethylformamide; and hexane. They can be used either individually or as a mixture thereof at an arbitrary mixing ratio. These organic solvents do not always need to be 100% pure and may contain impurities, such as isomers, unreacted matter, by-products, decomposition products, oxidation products, and water. The impurity content is preferably 30% or less, still preferably 10% or less.

The organic solvent used in the coating composition for the magnetic layer and that used in the coating composition for the nonmagnetic undercoat layer are preferably the same in kind but may be different in amount. It is advisable to use a solvent with high surface tension (e.g., cyclohexanone or dioxane) in the undercoat layer to improve coating stability. Specifically, it is important that the arithmetic mean of the solvent system of the cleaning layer be equal to or higher than that of the undercoat layer. A solvent with somewhat high polarity is preferred for improving dispersing capabilities for powders. The solvent system preferably contains at least 50% by weight of a solvent having a dielectric constant of 15 to 20. The solubility parameter of the solvent or the solvent system is preferably 8 to 11.

The cleaning medium of the invention, e.g., cleaning tape is effective with a thin nonmagnetic support. The thickness of the nonmagnetic support is as small as 2.0 to 10 μm. The total thickness of the cleaning layer and the undercoat layer ranges from one-hundredth to double the thickness of the support. A preferred thickness structure of the cleaning medium is composed of 0.05 to 1.5 μm of the cleaning layer, 0.2 to 5.0 μm of the undercoat layer, and 2.0 to 10 μm of the support. The total thickness of the cleaning medium (e.g., cleaning tape) is 4.0 to 15 μm. An adhesive layer may be provided between the nonmagnetic support and the undercoat layer to improve adhesion. The adhesive layer may have a thickness of 0.01 to 2 μm, preferably 0.02 to 0.5 μm. Any known adhesive can be used to form the adhesive layer.

The nonmagnetic backcoat layer is provided on the opposite side of the nonmagnetic support with respect to the cleaning layer. The thickness of the backcoat layer is 0.1 to 2 μm, preferably 0.3 to 1.0 μm. The binder and additive formulations of the cleaning layer and the undercoat layer can be applied to the composition of the backcoat layer. A preferred illustrative embodiment of the backcoat layer is described below.

The backcoat layer preferably contains carbon black for static prevention. Carbon black species customarily employed in magnetic recording tape can be used, including furnace black for rubber, thermal black for rubber, carbon black for colors, and acetylene black. In order to prevent the surface profile of the backcoat layer from being imprinted to the cleaning layer, the carbon black preferably has a particle size of 0.3 μm or smaller, still preferably 0.01 to 0.1 μm. The amount of the carbon black in the backcoat layer is such as to reduce an optical transmissive density of 2.0 or less as measured with a Macbeth densitometer TR-927.

It is advantageous for obtaining improved running durability to use two carbon black species different in average particle size. Specifically, fine particles with an average particle size of 0.01 to 0.04 μm and less fine particles with an average particle size of 0.05 to 0.3 μm are preferably used in combination.

The backcoat layer may contain a metal oxide, preferably titanium oxide, α-iron oxide or a mixture thereof. Titanium oxide and α-iron oxide commonly used in the art can be used. The particle shape is not particularly limited. The particle size is preferably 0.01 to 0.1 μm for spherical particles or 0.05 to 0.3 μm in terms of length of needle-like particles. The acicular ratio of needle-like particles is suitably 2 to 20. At least part of the surface of the metal oxide particles maybe modified into a different compound or coated with a surface treating compound such as $Al_2O_3$, $SiO_2$ or $ZrO_2$.

Binders of the backcoat layer include conventionally known thermoplastic resins, thermosetting resins and reactive resins. The backcoat layer is formed by applying a coating composition to the opposite side of the nonmagnetic support to the cleaning layer. The coating composition is prepared by dispersing the above-described particulate components and a binder in an organic solvent.

The nonmagnetic support that can be used in the invention has a micro Vickers hardness of 75 kg/mm$^2$ ($\approx$735 MPa) or higher. Useful supports include known biaxially stretched films of polyethylene terephthalate, polyethylene naphthalate, polyamide, polyimide, polyamide-imide, aromatic polyamide, and polybenzoxazole. In particular, a high strength nonmagnetic support made of aramid resin or polyethylene naphthalate is preferred. The support may be previously subjected to a surface treatment, such as a corona discharge treatment, a plasma treatment, a treatment for easy adhesion, a heat treatment, and a cleaning treatment.

For attaining the object of the present invention, it is preferred to use a nonmagnetic support having a centerline average surface roughness (Ra) of 0.5 to 7 nm on the side on which the cleaning layer is provided. It is preferred that the support not only have a small centerline average surface roughness but also be free from projections having a height of 1 µm or higher. Surface profile adjustment of the support can also be utilized to control the projection distribution on the cleaning layer. The size and the amount of the filler added to the nonmagnetic support may be selected appropriately for that purpose. Examples of useful fillers include crystalline or amorphous oxides or carbonates of Al, Ca, Si and Ti, and organic fine powders of acrylic resins or melamine resins. In order to accomplish the object of the invention while securing satisfactory running durability, it is preferred that the surface on which the backcoat layer is provided be rougher than the surface on which the cleaning layer is provided. The centerline average surface roughness Ra of the surface on which the backcoat layer is provided is preferably 1 nm or more, still preferably 4 nm or more. A nonmagnetic support whose surface roughness differs between the two sides thereof can be obtained by composing the support of two layers or by providing a coat.

The F-5 value of the nonmagnetic support is preferably 10 to 50 kg/mm$^2$ ($\approx$98 to 490 MPa) in the tape running direction (MD) and 10 to 30 kg/mm$^2$ ($\approx$98 to 294 MPa) in the tape width direction (TD). The F-5 value in the MD is generally higher than that in the TD, but this is not the case when the support is required to be stronger in the TD than in the MD. The thermal shrinkage of the support when treated at 100° C. for 30 minutes is preferably 3% or less, still preferably 1.5% or less, in both TD and MD. The thermal shrinkage at 80° C. for 30 minutes is preferably 1% or less, still preferably 0.5% or less, in both MD and TD. The support preferably has a breaking strength of 5 to 100 kg/mm$^2$ ($\approx$49 to 980 MPa) in both directions, a Young's modulus of 100 to 3,000 kg/mm$^2$ ($\approx$0.98 to 29.4 GPa), and a light transmission at 900 nm of 30% or less, still preferably 3% or less.

The method of preparing coating compositions for forming the undercoat layer and the cleaning layer includes at least the steps of kneading and dispersing and, if desired, the step of mixing which is provided before or after the step of kneading and/or the step of dispersing. Each step may be carried out in two or more divided stages. Any of the materials, including the magnetic powder, nonmagnetic powder, binder, carbon black, abrasive, antistatic, lubricant, and solvent, can be added at the beginning of or during any step. Individual materials may be added in divided portions in two or more steps. For example, polyurethane may be added dividedly in the kneading step, the dispersing step, and a mixing step that is provided for adjusting the viscosity of the dispersion.

Known techniques for coating composition preparation can be applied as a part of the method. The kneading step is preferably performed using a kneading machine with high kneading power, such as a continuous kneader or a pressure kneader. Where a continuous kneader or a pressure kneader is used, the magnetic powder, a part (preferably at least 30% of the total binder) or the whole of the binder, and 15 to 500 parts by weight of a solvent per 100 parts by weight of the magnetic powder are kneaded together in the first stage of kneading. For the details of the kneading operation, reference can be made to JP-A-1-106338 and JP-A-1-79274. In the preparation of the nonmagnetic coating composition for the undercoat layer, the step of dispersing is preferably carried out with the aid of a dispersing medium having a high specific gravity, desirably zirconia beads.

The cleaning medium having the preferred double layer structure can be produced by the following coating methods.

(a) A method comprising forming a lower layer (undercoat layer) by using coating equipment generally employed for a magnetic coating composition, such as a gravure coater, a roll coater, a blade coater or an extrusion coater, and applying an upper layer (cleaning layer) coating composition while the lower layer coating composition is wet by means of an extrusion coating apparatus disclosed in JP-B-1-46186, JP-A-60-238179, and JP-A-2-265672 which is of the type in which a support is pressed while coated.

(b) A method in which the lower layer coating composition and the upper layer coating composition are applied almost simultaneously through a single coating head disclosed in JP-A-63-88080, JP-A-2-17971, and JP-A-2-265672, the coating head having two slits through which the respective coating compositions pass.

(c) A method in which the lower layer composition and the upper layer composition are applied almost simultaneously by means of an extrusion coating apparatus disclosed in JP-A-2-174965, the apparatus being equipped with a back-up roll.

In order to prevent magnetic particles from agglomerating, it is advisable to give shear to the coating composition in the coating head. The techniques taught in JP-A-62-95174 and JP-A-1-236968 are suited for shear application. The coating compositions should satisfy the viscosity requirement specified in JP-A-3-8471.

If desired, the ferromagnetic powder of the cleaning layer may be subjected to orientation. Orientation is preferably performed using a combination of solenoids having a magnetic force of 100 mT or more and cobalt magnets having a magnetic force of 200 mT or more with the same poles facing each other. It is preferred to provide a pre-drying step before orientation, in which the wet coating layer is dried to a moderate degree so that the orientation may reach the highest degree after final drying.

It is preferred to pre-treat the surface of the support before applying the coating compositions of the undercoat layer and the cleaning layer to improve adhesion. Such pre-treatment includes provision of an adhesive resin layer, a corona discharge treatment, UV irradiation, and EB irradiation.

The thus formed cleaning layer is preferably calendered to adjust the projection density as desired. Heat resistant plastic rolls made of epoxy resins, polyimide, polyamide, polyimide-amide, etc. can be used as calendering rolls. Metallic calendering rolls are also employable. Calendering is preferably carried out at a roll temperature of 50° to 100° C., still preferably 80° to 100° C., under a linear pressure of 100 to 500 kg/m (≈980 to 4900 N/m), still preferably 200 to 400 kg/m (≈1960 to 3920 N/m), at a speed of 50 to 400 m/min, still preferably 100 to 300 m/min.

Both the cleaning layer and the backcoat layer of the cleaning medium preferably have a coefficient of friction against SUS420J of 0.1 to 0.5, still preferably 0.2 to 0.3. The cleaning medium preferably has a surface resistivity of $10^7$ Ω/sq. or less, an elastic modulus at 0.5% elongation of 100 to 2,000 kg/mm$^2$ (≈0.98 to 19.6 GPa) in both MD and TD, and a breaking strength of 1 to 30 kg/mm$^2$ (≈9.8 to 294 MPa).

The cleaning medium preferably has a Young's modulus of 300 to 1200 kg/mm$^2$ (≈2.94 to 11.76 GPa) in the MD and 200 to 1200 kg/mm$^2$ (≈1.96 to 11.76 GPa) in the TD and an MD/TD ratio of Young's modulus of 1/2 to 2/1.

The cleaning medium preferably has a residual elongation of 0.5% or less and a thermal shrinkage of 1% or less, still preferably 0.5% or less, even still preferably 0.1% or less, at temperatures of 100° C. or lower. The thermal shrinkage is ideally zero percent. The glass transition temperature (maximum loss elastic modulus in dynamic viscoelasticity measurement at 110 Hz) of the cleaning layer is preferably 50° to 120° C., and that of the undercoat layer is preferably 0° to 100° C. The loss elastic modulus preferably ranges $1 \times 10^7$ to $8 \times 10^8$ Pa. The loss tangent is preferably 0.2 or lower. Too high a loss tangent easily leads to a tack problem. The residual solvent content in the cleaning layer is preferably 100 mg/m$^2$ or less, still preferably 10 mg/m$^2$ or less. It is preferred that the residual solvent content in the cleaning layer be lower than that in the undercoat layer. Both the cleaning layer and the undercoat layer preferably have a void of 50% by volume or less, still preferably 40% by volume or less.

While the cleaning layer preferably has a centerline surface roughness Ra of 1.0 to 7.0 nm, the Ra should be decided appropriately according to the purpose. An RMS surface roughness ($R_{RMS}$) determined using an AFM is preferably in a range of from 2 to 15 nm.

The cleaning medium preferably has a surface resistivity of $1 \times 10^7$ Ω/sq. or less, still preferably $1 \times 10^5$ to $1 \times 10^6$ Ω/sq. Surface resistivity exceeding $1 \times 10^7$ Ω/sq. easily causes electric noises with an MR head.

Where the cleaning medium has a double layer structure having an undercoat layer and a cleaning layer, it is easily anticipated that the physical properties are varied between the cleaning layer and the undercoat layer according to the purpose. For example, the elastic modulus of the cleaning layer can be set relatively high to improve running durability, while that of the nonmagnetic layer can be set relatively low to improve head contact. Furthermore, it is effective in improving the head contact by changing the tensilizing method of the support. A support tensilized in the direction perpendicular to the MD often shows better head contact.

EXAMPLES

The present invention will now be illustrated in greater detail with reference to Examples, but it should be understood that the invention is not construed as being limited thereto. Unless otherwise noted, all the parts and percents are by weight.

Example 1

(a) Formation of Cleaning Layer

| Formulation of coating composition for cleaning layer: | |
| --- | --- |
| 1. Ferromagnetic metal powder (Fe/Co = 100/30; Hc: 2500 Oe (200 kA/m); $S_{BET}$: 49 m$^2$/g; crystallite size: 12 nm; surface layer: Al$_2$O$_3$, SiO$_2$, and Y$_2$O$_3$; particle size (length): 0.04 μm; acicular ratio: 7; σs: 125 A · m$^2$/kg) | 100 parts |
| 2. Vinyl chloride copolymer (MR110 from Zeon Corp.) | 5 parts |
| 3. Polyurethane resin (UR8300 from Toyobo Co., Ltd.) | 15 parts |
| 4. Cyclohexanone | 50 parts |
| 5. α-Al$_2$O$_3$ (average particle size: 0.20 μm) dispersion | 5 parts |
| 6. Carbon black (average particle size: 0.03 μm) | 0.3 parts |
| 7. Methyl ethyl ketone/toluene = 1/1 | 220 parts |
| 8. Butyl stearate | 2 parts |
| 9. Stearic acid | 1 part |
| 10. Stearamide | 1 part |
| 11. Methyl ethyl ketone (solvent) | 60 parts |
| 12. Polyisocyanate (Coronate L form Nippon Polyurethane Industry Co., Ltd.) | 13.5 parts |

Components 1 to 3 were kneaded with cyclohexanone (component 4) for 60 minutes. Components 5 to 7 were added, and the mixture was dispersed in a sand mill for 180 minutes. Components 8 to 9 (lubricant), component 10 (solvent), and component 11 were added, followed by stirring for 180 minutes. The resulting mixture was filtered through a filter having an average opening size of 0.5 μm to prepare a composition for cleaning layer.

The resulting coating composition was applied to a 6 μm thick polyethylene naphthalate film to a dry thickness of 1.3 μm, subjected to orientation in a magnetic field while the coating layer was wet, and dried to form a cleaning layer.

(b) Formation of Backcoat Layer

| Kneaded mixture-1: | |
| --- | --- |
| Carbon black (BP-800 from Cabot Corp.) | 100 parts |
| Nitrocellulose (RS1/2) | 100 parts |
| Polyurethane (N2301 from Nippon Polyurethane Industry Co., Ltd.) | 30 parts |
| Dispersant: | |
| Copper oleate | 5 parts |
| Copper phthalocyanine | 5 parts |
| Precipitated barium sulfate | 5 parts |
| Methyl ethyl ketone | 500 parts |
| Toluene | 500 parts |
| Kneaded mixture-2: | |
| Carbon black ($S_{BET}$: 8.5 m$^2$/g; average particle size: 270 μm; oil (DBP) absorption: 36 ml/100 g; pH 10) | 100 parts |
| Nitrocellulose | 100 parts |
| Polyurethane (N2301 from Nippon Polyurethane Industry) | 30 parts |
| Methyl ethyl ketone | 300 parts |
| Toluene | 300 parts |

The components of the kneaded mixture-1 were preliminarily kneaded in a roll mill and then dispersed together with the kneaded mixture-2 in a sand grinder. To the mixture were further added 5 parts of polyester resin (Vylon 300 from Toyobo Co., Ltd.) and 5 parts of polyisocyanate (Coronate L from Nippon Polyurethane) to prepare a coating composition for backcoat layer.

The coating composition for backcoat layer was applied to the other side of the support to a thickness of 0.3 μm and dried to form a backcoat layer. The coated film was calendered on a 7-roll calender composed of metal rolls and epoxy resin rolls and slit to ½ in. width to obtain a cleaning tape.

Example 2

A cleaning tape was prepared in the same manner as in Example 1, except for decreasing the amount of carbon black in the cleaning layer coating composition to 0.2 parts and changing the degree of dispersion of the cleaning layer coating composition as shown in Table 1 below. "Degree of dispersion" as referred to in Examples and Comparative Examples is a dispersing time expressed relatively taking the dispersing time in Example 1 (i.e., 180 minutes) as a standard (100%).

Example 3

A cleaning tape was prepared in the same manner as in Example 1, except for increasing the amount of carbon black in the cleaning layer coating composition to 1.0 part and changing the degree of dispersion of the cleaning layer coating composition as shown in Table 1 below.

Example 4

A coating composition for undercoat layer was prepared as follows.

| Formulation of coating composition for undercoat layer: | |
|---|---|
| 1. Nonmagnetic inorganic powder ($\alpha$-$Fe_2O_3$ (hematite); average particle size: 0.13 μm; $S_{BET}$: 55 m$^2$/g; surface layer: $Al_2O_3$ and $SiO_2$; pH: 6.0-8.5) | 85 parts |
| 2. Polyurethane resin (UR8300 from Toyobo) | 13.5 parts |
| 3. Cyclohexanone | 50 parts |
| 4. Methyl ethyl ketone/cyclohexanone (6/4) | 200 parts |
| 5. Butyl stearate | 4 parts |
| 6. Stearamide | 1 part |
| 7. Stearic acid | 3 parts |
| 8. Methyl ethyl ketone | 60 parts |
| 9. Polyisocyanate (Coronate L from Nippon Polyurethane Industry) | 5 parts |

The nonmagnetic inorganic powder (component 1) was pulverized in an open kneader for 10 minutes, and components 2 and 3 were added thereto, followed by kneading for 60 minutes. Then, component 4 was added, followed by dispersing for 120 minutes. To the dispersion were further added components 5 to 9, and the mixture was stirred for 180 minutes and filtered through a filter having an average opening size of 0.5 μm to prepare a coating composition for undercoat layer.

The coating composition for undercoat layer followed by the same coating composition for cleaning layer as prepared in Example 1 were applied almost simultaneously to the same support as used in Example 1 to a dry thickness of 1.4 μm and 0.12 μm, respectively. After the coating layers were dried, the same coating composition for backcoat layer was applied to the other side of the support to a dry thickness of 0.3 μm and dried. The coated web was calendered on a 7-roll calender composed of metal rolls and epoxy resin rolls and slit to ½ in. width.

Comparative Example 1

A cleaning tape was prepared in the same manner as in Example 1, except for increasing the amount of carbon black in the cleaning layer coating composition to 1.3 parts.

Comparative Example 2

A cleaning tape was prepared in the same manner as in Example 1, except for increasing the amount of carbon black in the cleaning layer coating composition to 5.0 parts and changing the degree of dispersion of the cleaning layer coating composition as shown in Table 1 below.

Comparative Example 3

A cleaning tape was prepared in the same manner as in Example 1, except that carbon black was not used in the cleaning layer coating composition.

Comparative Example 4

A cleaning tape was prepared in the same manner as in Example 1, except for increasing the amount of carbon black in the cleaning layer coating composition to 2.0 parts and changing the degree of dispersion of the cleaning layer coating composition as shown in Table 1 below.

Comparative Example 5

A cleaning tape was prepared in the same manner as in Example 1, except for increasing the amount of carbon black in the cleaning layer coating composition to 8.0 parts and changing the degree of dispersion of the cleaning layer coating composition as shown in Table 1 below.

The cleaning tapes obtained in Examples and Comparative Examples were measured and evaluated for 10 nm or higher projection density, microhardness, surface resistivity, adherent debris (stains) on an MR head, head wear, head cleaning performance, head scratch, and head electrical resistance in accordance with the following methods. The results obtained are shown in Tables 1 and 2.

(1) Projection Density

A 40 μm by 40 μm area of the cleaning layer was scanned with Nanoscope III (from Digital Instrument) in contact mode to obtain a 3D surface profile. The 3D surface profile was sliced at a level 10 nm high from the mean plane, a reference plane for which the volumes embraced by the 3D profile above and below the plane are equal. The number of the peaks sliced off and the peaks in contact with the slicing plane was counted and reduced to the number per unit area (μm$^2$).

(2) Microhardness

Microhardness was measured with a nanoindentation tester ENT-1100a available from Elionix Inc. in accordance with the method described supra. The equipment specifications and conditions of measurement are as follows.

Load application: electromagnetic force

Indenter: three-sided pyramidal diamond nanoindenter (rake angle: 65°; apex angle: 115°)

Load range: 2 mgf to 100 gf (20 μN to 1 N)

Loading resolution: 0.2 μN

Displacement measurement: travel of the nanoindenter was detected by capacitive sensing.

Maximum indentation depth: 20 μm

Displacement resolution: 0.3 nm

A 5 mm-side square test piece cut out of the cleaning tape was fixed with an adhesive on the exclusive stage made of aluminum, dried for fixation, and conditioned in the measuring environment for about 30 minutes before measurement.

Testing load: 5 mgf

Number of steps: 500

Step interval: 100 msec

Manner of loading: The load was continuously increased up to 5 mgf over 10 seconds, held at 5 mgf for one second, followed by unloading over 10 seconds.

Measuring environment: 28±0.1° C.

Measuring points: 7 (the value of n=5 from the median value was taken as a measured value.)

A load-displacement curve was prepared by the measurement (see FIG. 2). A tangent b to the unloading curve B at the maximum displacement Hmax was extrapolated to zero load to obtain a plastic deformation ($H_1$). The microhardness of the sample was calculated from the maximum displacement (Hmax) and the maximum load (Pmax=5 mgf) according to equation (1) described supra.

(3) Head Wear

The cleaning tape was run on an IBM LTO Ultrium tape drive (using an MR head) at 23° C., and 70% RH for 1 hour. The MR head height was measured before and after the cleaning tape running to obtain a head wear per 10 minutes.

(4) Heat Stains

After the heat wear testing in (3) above, the MR head was microscopically inspected for adherent debris (stains) by the cleaning tape.

(5) Head Cleaning Performance and Head Scratch

An initial output was previously measured using an LTO Ultrium 1 data cartridge (LTO FB UL-1 100 G E, from Fuji Photo Film Co., Ltd.) on the IBM LTO Ultrium drive. A standard tape prepared for the purpose of intentionally causing head clogging was run on the drive. Tape running was stopped when the head was soiled enough with dirt as observed with a stroboscope, which was afterward confirmed by no output. The soiled head was cleaned by running the cleaning tape on the drive for 1 minute, and the output was again measured using the same data cartridge. The difference in output between before the head soiling and after the head cleaning was taken as a measure of cleaning performance. The head after the cleaning was inspected for scratches.

(6) Electrical Resistance of MR Head

The resistivity of the MR head after the head wear test was measured.

(7) Surface Resistivity

A test piece of the cleaning tape was allowed to stand at 23±2° C. and RH of 40% to 60% for 24 hours. Two 24 Kt gold-plated, semicircularelectrodes having been surface finished to a grade of at least 4N were placed parallel to each other at a center-to-center distance of 12.65 mm and parallel to the ground. The test piece was put on the electrodes with its cleaning layer in contact with the electrodes. A load of 1.62N was applied to both ends of the test piece, and a direct voltage of 100V±10V was applied between the electrodes to measure the current. The surface resistivity of the test piece is calculated from the measured current.

TABLE 1

| | Projection Density (/μm²) | Micro-hardness (Mpa (kg/mm²)) | Degree of Dispersion* (%) | Surface Resistivity (Ω/sq.) |
|---|---|---|---|---|
| Example 1 | 1.5 | 588 (60) | 100 | $5 \times 10^6$ |
| Example 2 | 0.1 | 441 (45) | 120 | $1 \times 10^7$ |
| Example 3 | 5.0 | 294 (30) | 80 | $2 \times 10^6$ |
| Example 4 | 3.0 | 686 (70) | 100 | $5 \times 10^5$ |
| Comp. Example 1 | 2.5 | 245 (25) | 100 | $3 \times 10^6$ |
| Comp. Example 2 | 6.0 | 882 (90) | 50 | $6 \times 10^5$ |
| Comp. Example 3 | 0.03 | 980 (100) | 100 | $8 \times 10^8$ |
| Comp. Example 4 | 1.5 | 882 (90) | 120 | $2 \times 10^6$ |
| Comp. Example 5 | 10.0 | 490 (50) | 50 | $4 \times 10^5$ |

*The dispersing time in Example 1 is taken as a standard (100%).

TABLE 2

| | Head Stain | Head Wear (μm/10 min) | Head Cleaning Performance (dB) | Head Scratch | Resis-tance of MR Head (Ω) |
|---|---|---|---|---|---|
| Example 1 | no | 0.01 | 0 | no | 50 |
| Example 2 | no | 0.01 | −0.1 | no | 80 |
| Example 3 | no | 0.05 | −0.2 | no | 70 |
| Example 4 | no | 0.03 | −0.15 | no | 60 |
| Comp. Example 1 | yes | 0.01 | −2.0 | no | 10 |
| Comp. Example 2 | yes | 2.0 | −1.7 | yes | 60 |
| Comp. Example 3 | yes | 0.008 | −1.2 | no | 20 |
| Comp. Example 4 | yes | 0.07 | −0.5 | yes | 5 |
| Comp. Example 5 | no | 3.0 | −1.0 | no | 10 |

It is seen from Tables 1 and 2 that the cleaning tapes of Examples satisfying the specific conditions of projection density and microhardness exhibit higher head cleaning performance without involving head scratches and are less liable to contaminate the magnetic head and wear the head than the comparative cleaning tapes.

This application is based on Japanese Patent application JP 2004-279210, filed Sep. 27, 2004, the entire content of which is hereby incorporated by reference, the same as if set forth at length.

What is claimed is:

1. A cleaning medium for cleaning a magneto-resistive head comprising:
   a backcoat layer;
   a nonmagnetic support; and
   a cleaning layer containing ferromagnetic powder and a binder,
   in this order,
   wherein the cleaning layer has projections having a height of 10 nm or higher on a surface of the cleaning layer at a density of from 0.10 to 5.0/μm² and a surface microhardness of from 294 to 784 MPa.

2. The cleaning medium according to claim 1, further comprising an undercoat layer containing nonmagnetic inorganic powder and a binder between the nonmagnetic support and the cleaning layer.

3. The cleaning medium according to claim 1, which has a surface resistivity of $1\times10^7$ Ω/sq. or less.

4. The cleaning medium according to claim 1, which has a surface resistivity of from $1\times10^5$ to $1\times10^6$ Ω/sq.

5. The cleaning medium according to claim 1, wherein the cleaning layer has projections having a height of 10 nm or higher on a surface of the cleaning layer at a density of from 0.20 to 4.0/$\mu m^2$.

6. The cleaning medium according to claim 1, wherein the cleaning layer has projections having a height of 10 nm or higher on a surface of the cleaning layer at a density of from 0.50 to 3.0/$\mu m^2$.

7. The cleaning medium according to claim 1, wherein the cleaning layer has a surface microhardness of from 392 to 686 MPa.

8. The cleaning medium according to claim 1, wherein the cleaning layer has a surface microhardness of from 392 to 588 MPa.

9. The cleaning medium according to claim 1, wherein the ferromagnetic powder has a crystallite size of from 10 to 30 nm.

10. The cleaning medium according to claim 1, wherein the cleaning layer further contains carbon black.

* * * * *